United States Patent
Zhu et al.

(10) Patent No.: US 10,824,321 B2
(45) Date of Patent: Nov. 3, 2020

(54) METHOD AND APPARATUS FOR AUTOMATICALLY LOCKING AND UNLOCKING SCREEN DURING CHAT, MOBILE CLIENT, AND COMPUTER CLIENT

(71) Applicant: NETEASE (HANGZHOU) NETWORK CO., LTD., Zhejiang (CN)

(72) Inventors: Danmo Zhu, Zhejiang (CN); Zhiji Jiang, Zhejiang (CN); Jieying Hu, Zhejiang (CN); Wenwen Duan, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 251 days.

(21) Appl. No.: 15/760,634

(22) PCT Filed: Aug. 23, 2016

(86) PCT No.: PCT/CN2016/096437
§ 371 (c)(1),
(2) Date: Aug. 8, 2018

(87) PCT Pub. No.: WO2017/045515
PCT Pub. Date: Mar. 23, 2017

(65) Prior Publication Data
US 2018/0341382 A1    Nov. 29, 2018

(30) Foreign Application Priority Data
Sep. 16, 2015   (CN) .......................... 2015 1 0590241

(51) Int. Cl.
*G06F 3/0485*   (2013.01)
*G06F 3/0482*   (2013.01)
(Continued)

(52) U.S. Cl.
CPC .......... *G06F 3/0485* (2013.01); *G06F 3/0482* (2013.01); *G06F 3/04842* (2013.01);
(Continued)

(58) Field of Classification Search
CPC .. G06F 3/04845; G06F 3/04883; A63F 13/87; H04L 51/04
See application file for complete search history.

(56) References Cited

U.S. PATENT DOCUMENTS

2003/0134678 A1*  7/2003  Tanaka .................... G06F 3/048
                                                       463/42
2005/0223069 A1* 10/2005  Cooperman ......... G06Q 10/107
                                                       709/206
(Continued)

FOREIGN PATENT DOCUMENTS

CN          1908877 A      2/2007
CN        101060502 A     10/2007
(Continued)

OTHER PUBLICATIONS

"How can I prevent auto scroll when the user is manually scrolling" retrieved on Jan. 15, 2020, from https://stackoverflow.com/questions/24097585/how-can-i-prevent-auto-scroll-when-the-user-is-manually-scrolling originally posted on Jun. 7, 2014. (Year: 2014).*

(Continued)

*Primary Examiner* — Eric J. Bycer
(74) *Attorney, Agent, or Firm* — Yunling Ren (57) ABSTRACT

A method for automatically locking and unlocking a screen during a chat includes: determining a current scrolling direction of message in a chat window; and setting the chat window as a screen locked state when the current scrolling direction of message in the chat window is opposite to a scrolling direction of loading new message, wherein, in the screen locked state, the chat window is not automatically (Continued)

scrolled to a position of a new message upon receiving the new message. According to the present disclosure, compared with related art, intentions of a player for screen locking and unlocking are predicted by determining a scrolling situation of a chat window, such that the player can be facilitated in screen locking or unlocking before a manual operation of the player, thereby greatly improving the user experience of chat.

16 Claims, 7 Drawing Sheets

(51) Int. Cl.
  *G06F 3/0484* (2013.01)
  *G06F 3/0488* (2013.01)
  *H04L 12/58* (2006.01)
  *A63F 13/87* (2014.01)
(52) U.S. Cl.
  CPC .......... *G06F 3/04883* (2013.01); *A63F 13/87* (2014.09); *H04L 51/04* (2013.01)

(56) References Cited

U.S. PATENT DOCUMENTS

| | | | |
|---|---|---|---|
| 2006/0090137 A1 | 4/2006 | Cheng et al. | |
| 2007/0089066 A1* | 4/2007 | Chaudhri | G06F 3/0481 715/768 |
| 2007/0198646 A1* | 8/2007 | Chen | H04L 12/1822 709/207 |
| 2008/0092063 A1* | 4/2008 | Canfield | G06Q 10/10 715/753 |
| 2009/0094343 A1* | 4/2009 | Mehrotra | G06F 15/16 709/207 |
| 2009/0106686 A1* | 4/2009 | Shin | H04M 1/72552 715/781 |
| 2009/0260062 A1* | 10/2009 | Burkhart | H04L 51/043 726/3 |
| 2010/0058231 A1* | 3/2010 | Duarte | H04M 1/72552 715/800 |
| 2011/0145744 A1* | 6/2011 | Haynes | G06F 3/0481 715/766 |
| 2012/0117507 A1* | 5/2012 | Tseng | H04M 1/72552 715/774 |
| 2012/0149342 A1* | 6/2012 | Cohen | H04L 51/24 455/412.2 |
| 2013/0036357 A1* | 2/2013 | Hendrickson | G06F 3/0485 715/728 |
| 2013/0073990 A1* | 3/2013 | Park | G06Q 50/01 715/758 |
| 2013/0198296 A1* | 8/2013 | Roy | H04L 51/16 709/206 |
| 2013/0219299 A1* | 8/2013 | Yerli | G06F 3/0481 715/753 |
| 2014/0256295 A1* | 9/2014 | Peng | H04M 1/72547 455/412.2 |
| 2016/0050165 A1* | 2/2016 | Thomas | G06F 3/04855 715/752 |
| 2016/0301645 A1* | 10/2016 | Shan | G06Q 10/00 |

FOREIGN PATENT DOCUMENTS

| | | |
|---|---|---|
| CN | 103135967 A | 6/2013 |
| CN | 105260094 | 1/2016 |

OTHER PUBLICATIONS

RoXon, "demo 7" retrieved on Jan. 15, 2020, from https:jsbin.com/birusi/7/edit?html.js,output originally posted on Jul. 9, 2015. (Year: 2015).*
RoXon, "demo 8" retrieved on Jan. 15, 2020, from https:jsbin.com/birusi/8/edit?html.js,output originally posted on Jul. 9, 2015. (Year: 2015).*
The International Search Report issued in the counterpart PCT application No. PCT/CN2016/096437 dated Nov. 28, 2016, by the SIPO as the ISA.
The 1st office action issued in the counterpart CN application No. 201510590241.0 dated Aug. 23, 2016, by the SIPO.

* cited by examiner

METHOD AND APPARATUS FOR AUTOMATICALLY LOCKING AND UNLOCKING SCREEN DURING CHAT, MOBILE CLIENT, AND COMPUTER CLIENT

CROSS REFERENCE

The present application is an US national phase of International Application No. PCT/CN2016/096437, filed on Aug. 23, 2016, which is based upon and claims priority to Chinese Patent Application No. 201510590241.0, filed on Sep. 16, 2015, and the entire contents thereof are incorporated herein by reference.

TECHNICAL FIELD

The disclosure relates to a method for unlocking and locking a screen during a chat, in particular to a method for automatically locking and unlocking a screen during a chat, and relates to an apparatus for implementing the above method.

BACKGROUND

Online game players usually communicate through a chat window when playing a game. Currently, during the process of viewing history chat content in the chat window of the game, if there is a new message, the chat content will automatically scroll to the position of a new message. Because the number of online game players is very large, especially in the world channel or some gang channels listed in the chat window the new messages are refreshed frequently at any time, which often hinders the player's process of reading history messages.

SUMMARY

The present disclosure is proposed to overcome the shortcomings and deficiencies of the related art, and to provide a method and an apparatus for automatically locking and unlocking a screen during a chat.

The present disclosure is achieved by the following technical solution. A method for automatically locking and unlocking a screen during a chat includes following steps:

determining a current scrolling direction of message in a chat window, and setting the chat window as a screen locked state when the current scrolling direction of message in the chat window is opposite to a scrolling direction of loading new message, wherein, in the screen locked state, the chat window is not automatically scrolled to a position of a new message upon receiving the new message.

The present disclosure further provides an apparatus for automatically locking and unlocking a screen during a chat, including:

a judgment unit, configured to determine a current scrolling direction of message in a chat window; and an automatic screen lock and unlock unit, configured to perform a screen lock operation corresponding to determination result of the judgment unit, and set the chat window as a screen locked state when the current scrolling direction of message in the chat window is opposite to a scrolling direction of loading new message, wherein, in the screen locked state, the chat window is not automatically scrolled to a position of a new message upon receiving the new message.

Correspondingly, in order to apply the above-mentioned apparatus for automatically locking and unlocking a screen during a chat in a mobile client, such as a cell phone or a tablet computer, the present disclosure also provides a mobile client, including the above-mentioned apparatus for automatically locking and unlocking a screen during a chat.

Correspondingly, in order to apply the above-mentioned apparatus for automatically locking and unlocking a screen during a chat in a computer client the present disclosure also provides a computer client, including the above-mentioned apparatus for automatically locking and unlocking a screen during a chat.

The present disclosure further provides an apparatus for automatically locking and unlocking a screen during a chat including:

a processor, and a memory, configured to store executable instructions of the processor; wherein the processor is configured to perform:

determining a current scrolling direction of message in a chat window; and setting the chat window as a screen locked state when the current scrolling direction of message in the chat window is opposite to a scrolling direction of loading new message, wherein, in the screen locked state, the chat window is not automatically scrolled to a position of a new message upon receiving the new message.

The present disclosure further provides a computer readable storage medium, storing a computer program, wherein when the program is executed by the processor, the method for automatically locking and unlocking a screen during a chat is implemented.

BRIEF DESCRIPTION OF THE DRAWINGS

For a better understanding and implementation, the disclosure will be described in detail below with reference to the drawings.

DETAILED DESCRIPTION

Figure 1:
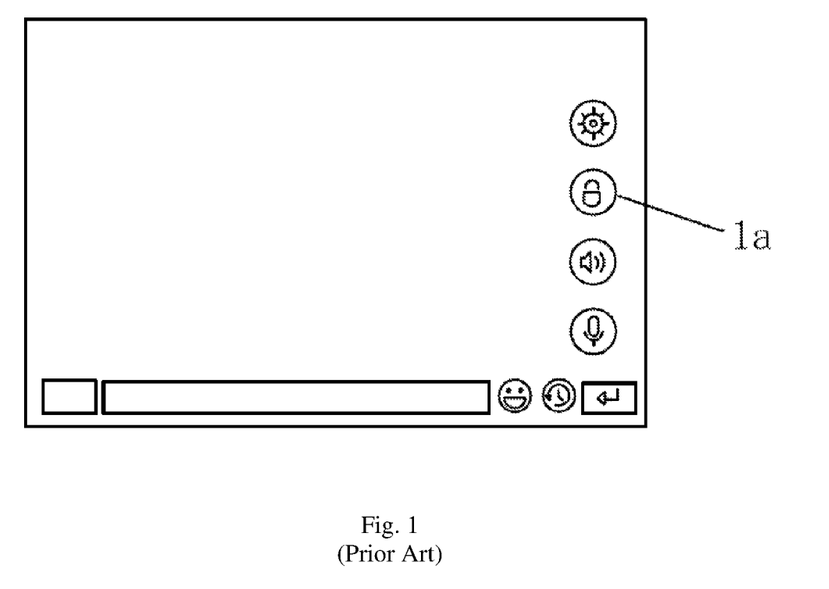
FIG. 1 is a schematic diagram illustrating a chat window interface according to related art.

Referring to FIG. 1, which is a schematic diagram of a chat window interface according to related art. Therefore, in view of the above problems, a method is proposed in related art by additionally providing a "screen lock/unlock" button 1a. The "screen lock/unlock" button may trigger two states: a screen locked state and a screen unlocked state. Two states are switched by clicking the button. When the button is in the screen locked state, the player can freely browse the history message by scrolling tip and down, and the displayed content does not automatically scroll with the refreshing message; when the screen unlocked state is triggered by clicking the button, the message list is pushed to scroll up with the new message content.

However, there are following two drawbacks in related art.

Firstly, the method is implemented manually. Players need to manually lock the screen before sliding to view history messages, in order to ensure that the chat content does not automatically scroll. After the screen is locked, players also need to manually unlock it to enable the message to be automatically refreshed and scrolled.

Secondly, after the screen is locked, there is no reminder for a new message. In the screen locked state, since there is no automatic refreshment, unless the players drag the chat content to the bottom by themselves, there is no other way to know whether there is new message.

First Embodiment

The present disclosure is related to the technical defects in the related art that can only be used to manually lock and unlock a screen. In order to reduce the operation steps to manually lock or unlock the screen for users, the present disclosure provides a method for automatically locking and unlocking a screen during a chat. The method is described as following.

Figure 2:
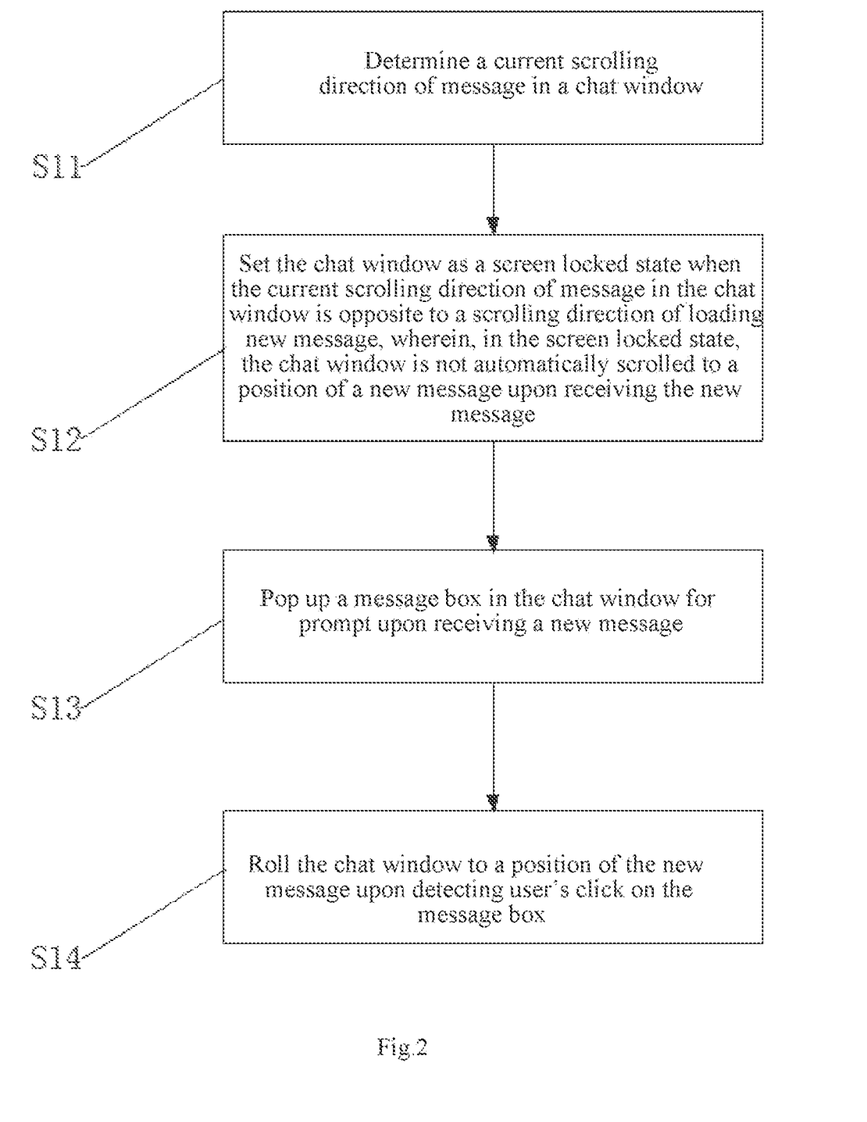
FIG. 2 is a flow chart illustrating a method for locking and unlocking a screen during a chat according to a first embodiment.

Referring to FIG. 2, which is a flow chart illustrating a method for locking and unlocking a screen during a chat according to a first embodiment. The disclosure provides a method for automatically locking and unlocking a screen during a chat, which mainly includes steps S11-S14.

In step S11, a current scrolling direction of message in a chat window is determined.

In step S12, the chat window is set as a screen locked state when the current scrolling direction of message in the chat window is opposite to a scrolling direction of loading new message. In the screen locked state, the chat window is not automatically scrolled to a position of a new message upon receiving the new message.

Since the current chat window interface lists the chat messages in sequence, the new message is usually located below or above the chat window. When the new message is located below the chat window, message of the chat window is continuously scrolled upward; when the new message is located above the chat window, message of the chat window is continuously scrolled downward.

When the new message is located below history message in the chat window, the chat window is set as the screen locked state upon determining that the current scrolling direction of message is downward. Otherwise, when the new message is located above the history message in the chat window, the chat window is set as the screen locked state upon determining that the current scrolling direction of message is upward.

In step S13, a message box is popped up in the chat window for prompt upon receiving a new message.

In step S14, the chat window is scrolled to a position of the new message upon detecting a click on the message box.

According to the present disclosure, compared with related art, intentions of a player for screen locking and unlocking are predicted by determining a scrolling situation of a chat window, such that the player can be facilitated in screen locking or unlocking before a manual operation of the player, thereby greatly improving the user experience of chat. When the current scrolling direction of chat message in the chat window is opposite to the scrolling direction of loading new chat message, it indicates that the player intends to view history message at this time, so the chat window is automatically locked for preventing the chat message in chat window from being automatically scrolled to the bottom when the new message emerges. Moreover, manual operation of the player can be intelligently avoided.

In addition, the present disclosure also provides a function of a new message prompt in the screen locked state, which solves the problem that the player may ignore the new message in the screen locked state, such that the player can quickly return to the position of the latest message for reading by clicking the prompt. The player can be prompted with the new message in time, and also can quickly read the new message by clicking the prompt information, thus the operation is more convenient.

Moreover, the method for automatically locking and unlocking a screen dining a chat may be applied in a chat window of a game, where there may be a large number of players and messages are refreshed frequently. According to the method for automatically locking and unlocking a screen, the players can be facilitated to quickly read history messages and also quickly switch to new messages for reading.

Second Embodiment

The second embodiment is further proposed based on the first embodiment by adding a screen unlocked state. Specifically, the chat window is set as the screen unlocked state upon determining that the chat window is scrolled to a position of a new message. Further a screen lock-unlock button is also provided to switch between the screen locked and unlocked states by manually performing screen lock and unlock operations. At the same time, the second embodiment further provides a more completely flow including following steps.

Figure 3:
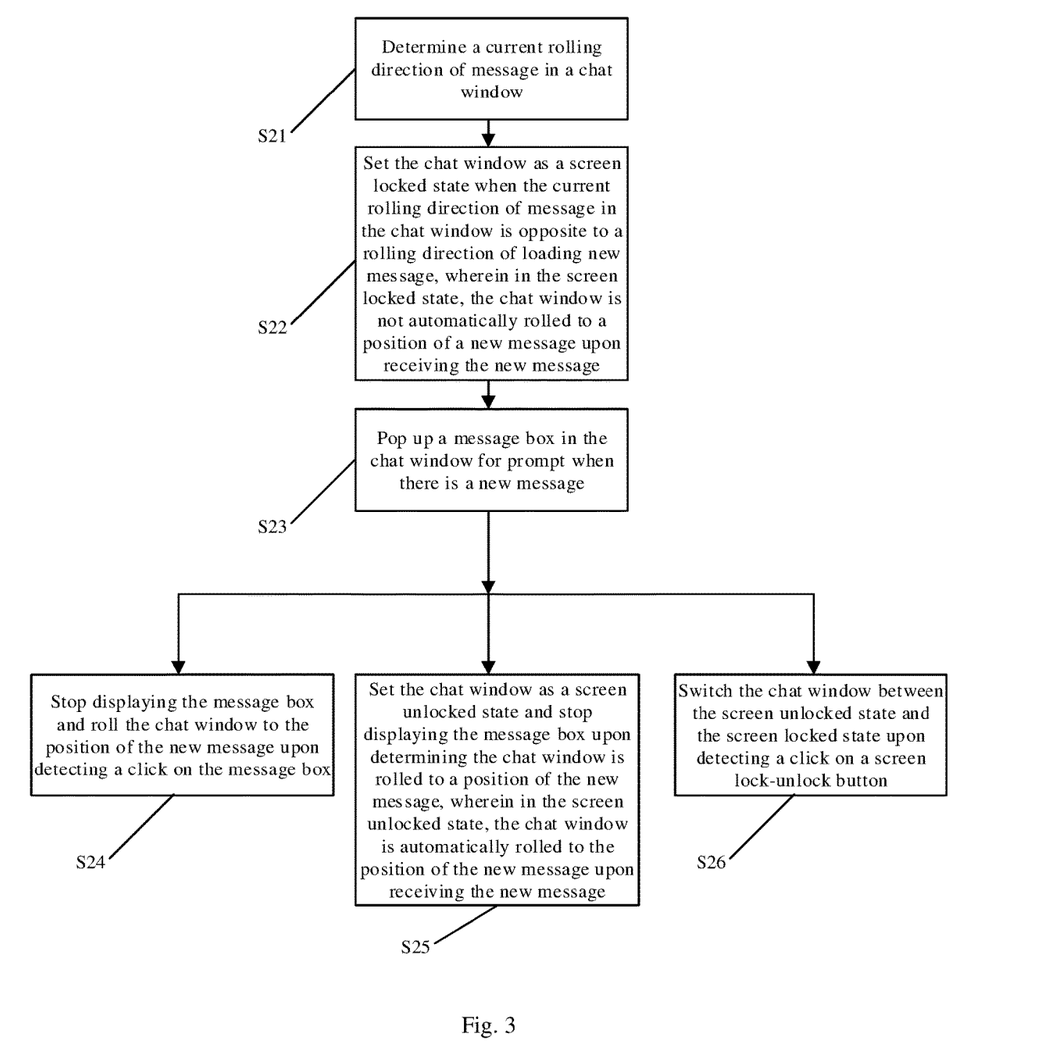
FIG. 3 is a flow chart illustrating a method for locking and unlocking a screen during a chat according to a second embodiment.

Referring to FIG. 3, which is a flow chart illustrating a method for locking and unlocking a screen during a chat according to a second embodiment. The second embodiment provides a method for automatically locking and unlocking a screen during a chat, which mainly includes following steps S21-S26.

In step S21, a current scrolling direction of message in a chat window is determined.

Specifically, the step of determining a current scrolling direction of message in a chat window includes: determining the current scrolling direction of message in the chat window through motion trail of touch gesture on a touch layer provided on the chat window. The method may be implemented by a device with a touch screen for providing the touch layer, for example, a mobile device such as a cell phone, a tablet computer and the like.

The touch layer may be implemented through specific steps. A layer of Swallow Touch is provided on the Scrollview and set as False, such that the message layer can be directly operated when a touch is applied. Moreover, a coordinate system is created within the chat window, in which system an X-axis refers to directions of leftward and rightward, and a Y-axis refers to directions of upward and downward. Accordingly, a gesture direction can be recognized through the motion trail of touch gesture in the Y-axis direction. For example, if the gesture is recognized as upward, the chat window is automatically switched to the screen locked state; if the gesture is recognized as downward and items in the Scrollview includes the last message, the chat window is automatically switched to the screen unlocked state.

In step S22, the chat window is set as the screen locked state when the current scrolling direction of message in the chat window is opposite to a scrolling direction of loading new message. In the screen locked state, the chat window is not automatically scrolled to a position of a new message upon receiving the new message.

Specifically, when the new message is located below history message in the chat window, the chat window is set as the screen locked state upon determining that the current scrolling direction of message is downward which indicates that the player intends to view history message at this time. Otherwise, when the new message is located above the history message in the chat window, the chat window is set as the screen locked state upon determining that the current scrolling direction of message is upward which indicates that the player intends to view history message at this time.

In step S23, a message box is popped up in the chat window for prompt when there is a new message.

Specifically, in this step, when the new message is prompted in the chat window, the following specific steps are included: popping up a translucent message box at top of the chat window, the message box being displayed with number of the new message.

In step S24, the display of the message box is stopped and the chat window is scrolled to the position of the new message upon detecting a click on the message box.

In step S25, the chat window is set as the screen unlocked state and the display of the message box is stopped upon determining the chat window is scrolled to a position of the new message. In the screen unlocked state, the chat window is automatically scrolled to the position of the new message upon receiving the new message.

When the chat window is scrolled to the position of a new message, it indicates that the player intends to view history message at this time, so the chat window is automatically unlocked such that new message can be displayed timely.

In step S26, the chat window is switched between the screen unlocked state and the screen locked state upon detecting a click on a screen lock-unlock button.

Figure 4:
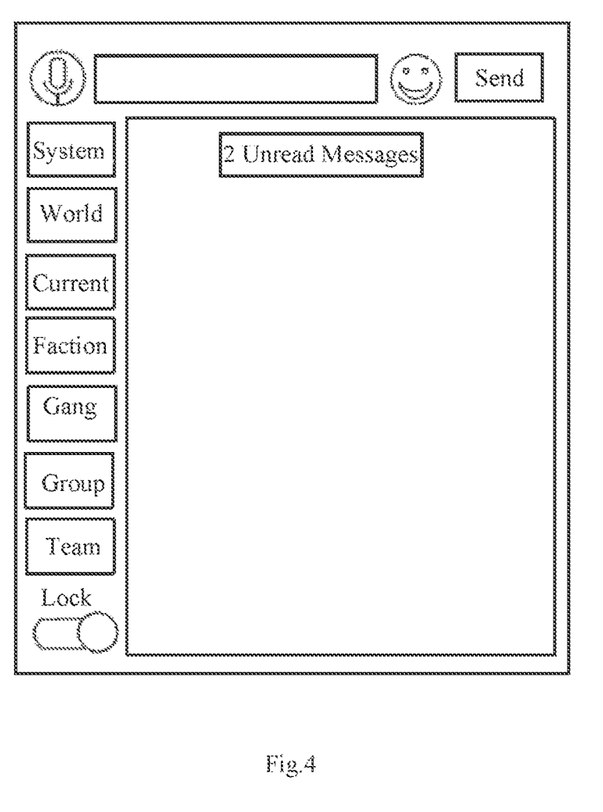
FIG. 4 is a schematic diagram illustrating a chat window interface according to an embodiment of the present disclosure.

Referring to FIG. 4, which is a schematic diagram illustrating a chat window interface according to the second embodiment. The process of the method for automatically locking and unlocking the screen of the chat of the present disclosure is described as follow.

Firstly, when players intend to view history information, the chat window is automatically set as the screen locked state when the chat window is scrolled up with a finger, and the chat window will not be scrolled to the position of the new message upon receiving a new message. In addition, in the second embodiment, the chat window is set as the screen locked state upon detecting a click on a screen lock-unlock button.

When there is a new message, a pop-up is used to display the number of new message, for example, displayed as: "2 new messages incoming"; when the user clicks the pop-up, the chat window is scrolled to the position of the new message and the chat window is set as the screen unlocked state. Or, the chat window is set as the screen unlocked state upon determining the chat window is scrolled to the new message. In addition, the chat window is set as a screen locked state upon detecting a click on a screen lock-unlock button.

According to the present disclosure, compared with related art, intentions of a player for screen locking and unlocking are predicted by determining a scrolling situation of a chat window, such that the player can be facilitated in screen locking or unlocking before a manual operation of the player, thereby greatly improving the user experience of chat. When the current scrolling direction of chat message in the chat window is opposite to the scrolling direction of loading new chat message, it indicates that the player intends to view history message at this time, so the chat window is automatically locked, preventing the chat message in chat window from being automatically scrolled to the bottom when the new message emerges. Moreover, manual operation of the player can be intelligently waived.

In addition, the present disclosure also provides a function of a new message prompt in the screen locked state, which solves the problem that the player cannot know the new message in the screen locked state, such that the player can quickly return to the position of the latest message for reading by clicking the prompt. The player can be prompted with the new message in time, and also can quickly read the new message by clicking the prompt information, thus the operation is more convenient.

Moreover, the method for automatically locking and unlocking a screen during a chat may be applied in a chat window of a game, where there may be a large number of players and messages are refreshed frequently. According to the method for automatically locking and unlocking a screen, the players can be facilitated to quickly read history messages and also quickly switch to new messages for reading.

At the same time, the disclosure also remains a screen lock-unlock button, and the user can also switch a chat window between the screen locked and unlocked states manually.

Figure 5:
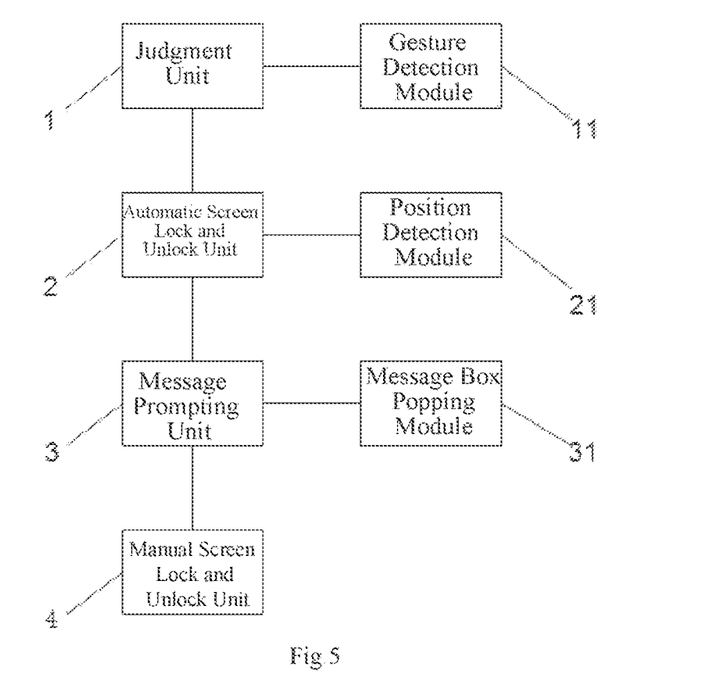
FIG. 5 is a block diagram illustrating an apparatus for locking and unlocking a screen during a chat according to an embodiment of the present disclosure.

Referring to FIG. 5, which is a block diagram illustrating an apparatus for locking and unlocking a screen during a chat. In order to implement the above method for locking and unlocking the chat screen, the present disclosure further provides an apparatus for locking and unlocking the chat, screen, including a judgment unit 1, an automatic screen lock and unlock unit 2, a message prompting unit 3 and a manual screen lock and unlock unit 4.

The judgment unit 1 is configured to determine a scrolling direction of the current chat message in a chat window. Specifically, the judgment unit 1 includes a gesture detecting module 11, which is configured to determine the current scrolling direction of message in the chat window through motion trail of touch gesture on a touch layer provided within the chat window.

The automatic screen lock and unlock unit 2 is configured to perform a screen lock operation corresponding to determination result of the judgment unit. When the chat window is scrolled up, the current chat interface is set as a screen locked state. In the screen locked state, when the new message emerges, the chat window is not automatically scrolled to a position of the new message.

The chat window is set as the screen locked state by the automatic screen lock and unlock unit upon determining that the current scrolling direction of message is downward when the new message is located below history message in the chat window. Otherwise, the chat window is set as the screen locked state by the automatic screen lock and unlock unit upon determining that the current scrolling direction of message is upward when the new message is located above the history message in the chat window.

Further, the automatic screen lock and unlock unit 2 further includes a position detecting module 21, which is configured to detect a position of a message in the chat window, and set the chat window as the screen unlocked state upon determining the chat window is scrolled to the position of the new message. In the screen unlocked state, the chat window is automatically scrolled to the position of the new message upon receiving the new message.

The message prompting unit 3 is configured to pop up a message box in the chat window for reminder upon receiving a new message. The display of the message box is stopped and the chat window is scrolled to the position of the new message upon detecting a click on the message box, and the automatic screen lock and unlock unit performs a screen unlock operation.

Specifically, the message prompting unit 3 includes a box popping module 31, which is configured to pop up a translucent message box at top of the chat window upon receiving a new message in the screen locked state. The message box is displayed with number of the new message. The display of the message box is stopped upon determining the chat window is scrolled to a position of the new message. Moreover, the display of the message box is stopped and the chat window is scrolled to the position of the new message upon detecting a click on the message box.

The manual screen lock and unlock unit 4 is configured to switch the chat window between the screen locked state and a screen locked state upon detecting a click on a screen lock-unlock button.

The specific process of an apparatus for locking and unlocking a chat screen of the present disclosure is described as following.

Firstly, when the players intend to view history information, the chat window is automatically set as the screen locked state when the chat window is scrolled up with a finger. When the new loaded message is positioned below the history chat message in the chat window, the state of scrolling down of the message of the chat window indicates that the user is browsing the history message. The judgment unit 1 determines whether the chat window is scrolling downward or not at this time.

If the chat window is scrolling downward, the chat window is set as the screen locked state by the automatic screen lock and unlock unit 2. In the screen locked state, the chat window will not be automatically scrolled to the position of the new message upon receiving the new message. In addition, in the second embodiment, the chat window is switched between the screen unlocked state and the screen locked state by the manual screen lock and unlock unit 4 upon detecting a click on a screen lock-unlock button.

When there is new messages, a pop-up is used to display the number of new message, for example, displayed as: "2 new messages incoming"; when the user clicks the pop-up, the chat window is scrolled to the position of the new message and the automatic screen lock and unlock unit 2 performs a screen unlock operation. On the display of the message box is stopped and the automatic screen locked and unlocked unit 2 performs a screen unlocked operation upon determining the chat window is scrolled to the new message. In addition, the manual screen lock and unlock unit 4 performs a screen unlocked operation upon detecting a click on a screen lock-unlock button.

Figure 6:
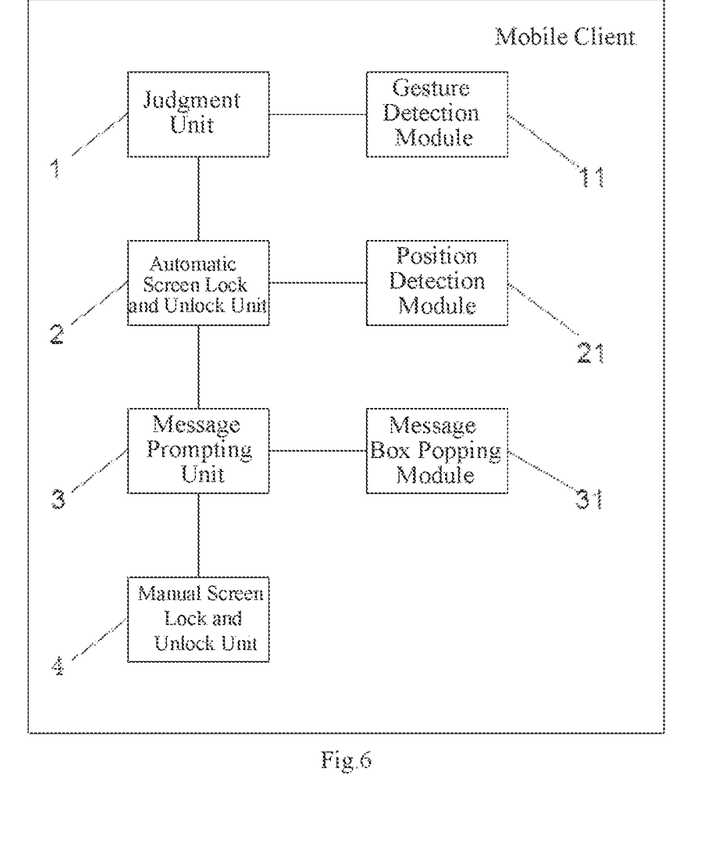
FIG. 6 is a block diagram illustrating a mobile client according to an embodiment of the present disclosure.

Referring to FIG. 6, which is a block diagram illustrating a mobile client. Correspondingly, in order to use the above-mentioned apparatus for automatically locking and unlocking a chat screen for a mobile client, such as a mobile phone or a tablet computer, the present disclosure also provides a mobile client, including an apparatus for automatically locking and unlocking a chat screen. The apparatus for automatically locking and unlocking a chat screen includes a judgment unit 1, an automatic screen lock and unlock unit 2, a message prompting unit 3 and a manual screen lock and unlock unit 4.

The judgment unit 1 is configured to determine a scrolling direction of the current message in a chat window. Specifically, the judgment unit 1 includes a gesture detecting module 11, which is configured to determine the current scrolling direction of message in the chat window through motion trail of touch gesture on a touch layer provided within the chat window.

The automatic screen lock and unlock unit 2 is configured to perform a screen lock operation corresponding to determination result of the judgment unit. When the chat window is scrolled up, the current chat interface is set as a screen locked state. In the screen locked state, when the new message emerges, the chat window is not automatically scrolled to a position of the new message.

Further, the automatic screen locked and unlocked unit 2 further includes a position detecting module 21, which is configured to detect the position of a message in the chat window; and set the chat window as the screen unlocked state upon determining the chat window is scrolled to the new message. In the screen unlocked state, the chat window is automatically scrolled to the position of the new message upon receiving the new message.

The message prompting unit 3 is configured to pop up a message box in the chat window for reminder upon receiving a new message. The display of the message box is stopped and the chat window is scrolled to the position of the new message upon detecting a click on the message box, and the automatic screen lock and unlock unit performs a screen unlock operation.

Specifically, the message prompting unit 3 includes a box popping module 31, which is configured to pop up a translucent message box at top of the chat window upon receiving a new message in the screen locked state. The message box is displayed with number of the new message. The display of the message box is stopped upon determining the chat window is scrolled to a position of the new message. Moreover, the display of the message box is stopped and the chat window is scrolled to the position of the new message upon detecting a click on the message box.

The manual screen lock and unlock unit 4 is configured to switch the chat window between the screen locked state and a screen locked state upon detecting a click on a screen lock-unlock button.

Figure 7:
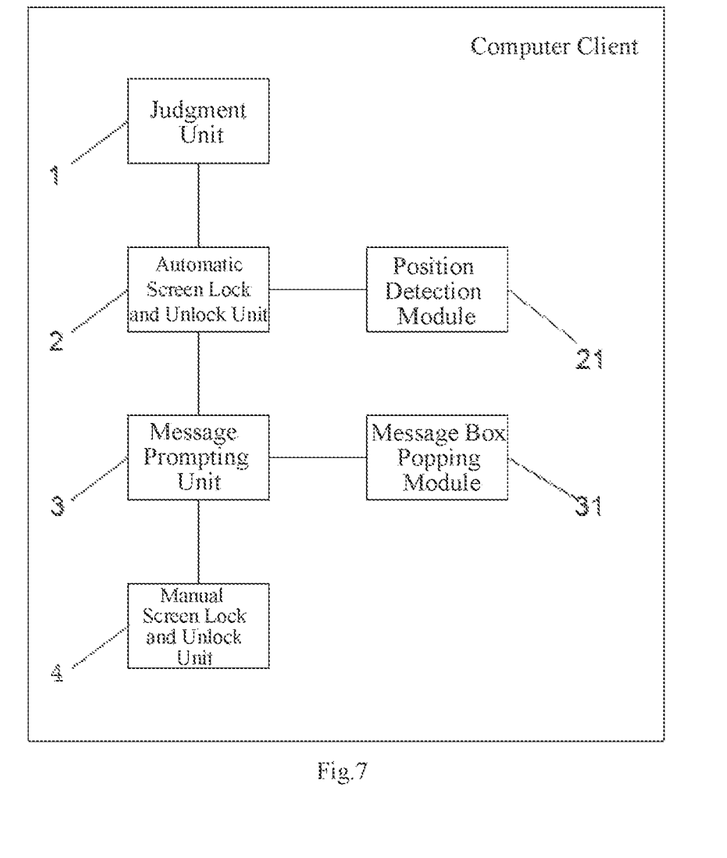
FIG. 7 is a block diagram illustrating a computer client according to an embodiment of the present disclosure.

Referring to FIG. 7, which is a block diagram illustrating a computer client. Correspondingly, in order to use the above-mentioned apparatus for automatically locking and unlocking a chat screen for a computer client, the present disclosure further provides a computer client, including the above-mentioned apparatus for automatically locking and unlocking a chat screen.

The apparatus for automatically locking and unlocking a chat screen includes a judgment unit 1, an automatic screen lock and unlock unit 2, a message prompting unit 3 and a manual screen lock and unlock unit 4.

The judgment unit 1 is configured to determine a scrolling direction of the current message in a chat window. Specifically, the scrolling direction of the chat window can be determined by the scrolling direction of the mouse wheel of the computer at this time.

The automatic screen locked and unlocked unit 2 is configured to perform a screen lock operation according to the determining result of the determining unit. When the chat window is scrolled up, the current chat interface is set as a screen locked state. In the screen locked state, when the new message emerges, the chat window is not automatically scrolled to a position of the new message.

Specifically, The automatic screen lock and unlock unit 2 further includes a position detecting module 21, which is configured to detect the position of a message in the chat window, and set the chat window as the screen unlocked state upon determining the chat window is scrolled to the new message. In the screen unlocked state, the chat window is automatically scrolled to the position of the new message upon receiving the new message.

The message prompting unit 3 is configured to pop up a message box in the chat window for reminder upon receiving a new message. The display of the message box is stopped and the chat window is scrolled to the position of the new message upon detecting a click on the message box, and the automatic screen lock and unlock unit performs a screen unlock operation.

Specifically, the message prompting unit 3 includes a box popping module 31, which is configured to pop up a translucent message box at top of the chat window upon receiving a new message in the screen locked state. The message box is displayed with number of the new message. The display of the message box is stopped upon determining the chat window is scrolled to a position of the new message. Moreover, the display of the message box is stopped and the chat window is scrolled to the position of the new message upon detecting a click on the message box.

The manual screen lock and unlock unit 4 is configured to switch the chat window between a screen locked state and a screen locked state upon detecting a click on a screen lock-unlock button.

In summary, according to the present disclosure, compared with related art, intentions of a player for screen locking and unlocking are predicted by determining a scrolling situation of a chat window, such that the player can be facilitated in screen locking or unlocking before a manual operation of the player, thereby greatly improving the user experience of chat. When the current scrolling direction of chat message in the chat window is opposite to the scrolling direction of loading new chat message, it indicates that the player intends to view history message at this time, so the chat window is automatically locked, preventing the chat message in chat window from being automatically scrolled to the bottom when the new message emerges. Moreover manual operation of the player can be intelligently avoided.

In addition, the present disclosure also provides a function of a new message prompt in the screen locked state, which solves the problem that the player cannot know the new message in the screen locked state, such that the player can quickly return to the position of the latest message for reading by clicking the prompt. The player can be prompted with the new message in time, and also can quickly read the new message by clicking the prompt information, thus the operation is more convenient.

The present disclosure is not limited to the above-mentioned embodiments. If any replacement or variations are made without departing from the spirit of the present application, and these replacement and variations fall within the equivalent technical scope of the present disclosure, and the present disclosure shall intend to include these replacement and variations.

What is claimed is:

1. A method for automatically locking and unlocking a screen during a chat, comprising:
   determining a current scrolling direction of message in a chat window; and
   setting the chat window as a screen locked state when the current scrolling direction of message in the chat window is opposite to a scrolling direction of loading new message,
   wherein, in the screen locked state, the chat window is not automatically scrolled to a position of a new message upon receiving the new message, and
   wherein the method further comprises:
   popping up a message box in the chat window for reminding upon receiving a new message in the screen locked state, and
   setting the chat window as a screen unlocked state and scrolling the chat window to a position of the new message upon detecting a click on the message box.

2. The method of claim 1, wherein the setting the chat window as a screen locked state comprises:
   setting the chat window as the screen locked state upon determining that the current scrolling direction of message is downward when the new message is located below history message in the chat window; or
   setting the chat window as the screen locked state upon determining that the current scrolling direction of message is upward when the new message is located above the history message in the chat window.

3. The method of claim 1, further comprising:
   setting the chat window as the screen unlocked state upon determining the chat window is scrolled to the new message,
   wherein, in the screen unlocked state, the chat window is automatically scrolled to the position of the new message upon receiving the new message.

4. The method of claim 1, wherein the determining a current scrolling direction of message in a chat window comprises:
   determining the current scrolling direction of message in the chat window through motion trail of touch gesture on a touch layer provided on the chat window.

5. The method of claim 1, further comprising:
   popping up a translucent message box at top of the chat window upon receiving a new message in the screen locked state, the message box being displayed with number of the new message; and
   stop displaying the message box upon determining the chat window is scrolled to a position of the new message.

6. The method of claim 1, further comprising:
   switching the chat window between the screen locked state and a screen locked state upon detecting a click on a screen lock-unlock button.

7. The method of claim 1, further comprising:
   popping up a translucent message box at top of the chat window upon receiving a new message in the screen locked state, the message box being displayed with number of the new message; and
   stop displaying the message box and scrolling the chat window to the position of the new message upon detecting a click on the message box.

8. An apparatus for automatically locking and unlocking a screen during a chat, comprising:
   a processor, and
   a memory, configured to store executable instructions of the processor; wherein
   the processor is configured to perform:
   determining a current scrolling direction of message in a chat window; and setting the chat window as a screen locked state when the current scrolling direction of message in the chat window is opposite to a scrolling direction of loading new message, wherein, in the screen locked state, the chat window is not automatically scrolled to a position of a new message upon receiving the new message, and wherein the processor is further configured to perform:

popping up a message box in the chat window for reminding upon receiving a new message in the screen locked state, and setting the chat window as a screen unlocked state and scrolling the chat window to a position of the new message upon detecting a click on the message box.

9. The apparatus of claim 8, wherein the processor configured to perform setting the chat window as a screen locked state is configured to perform:

setting the chat window as the screen locked state upon determining that the current scrolling direction of message is downward when the new message is located below history message in the chat window; or setting the chat window as the screen locked state upon determining that the current scrolling direction of message is upward when the new message is located above the history message in the chat window.

10. The apparatus of claim 8, the processor is further configured to perform:

setting the chat window as the screen unlocked state upon determining the chat window is scrolled to the new message, wherein, in the screen unlocked state, the chat window is automatically scrolled to the position of the new message upon receiving the new message.

11. The apparatus of claim 8, wherein the processor configured to perform determining a current scrolling direction of message in a chat window is configured to perform:

determining the current scrolling direction of message in the chat window through motion trail of touch gesture on a touch layer provided within the chat window.

12. The apparatus of claim 8, the processor is further configured to perform:

popping up a translucent message box at top of the chat window upon receiving a new message in the screen locked state, the message box being displayed with number of the new message; and stop displaying the message box upon determining the chat window is scrolled to a position of the new message.

13. The apparatus of claim 8, the processor is further configured to perform:

switching the chat window between the screen locked state and a screen locked state upon detecting a click on a screen lock-unlock button.

14. The apparatus of claim 8, the processor is further configured to perform:

popping up a translucent message box at top of the chat window upon receiving a new message in the screen locked state, the message box being displayed with number of the new message; and stop displaying the message box and scrolling the chat window to the position of the new message upon detecting a click on the message box.

15. A mobile terminal client, comprising the apparatus for automatically locking and unlocking a screen during a chat of claim 8.

16. A computer client, comprising the apparatus for automatically locking and unlocking a screen during a chat of claim 8.

* * * * *